United States Patent

[11] 3,574,351

[72] Inventor Donald D. Stoltman
 Henrietta, N.Y.
[21] Appl. No. 872,669
[22] Filed Oct. 30, 1969
[45] Patented Apr. 13, 1971
[73] Assignee General Motors Corporation
 Detroit, Mich.

[54] RECIPROCATING SEAL ASSEMBLY
 2 Claims, 6 Drawing Figs.
[52] U.S. Cl. .................................................. 277/212
[51] Int. Cl. ..................................................... F16j 9/08
[50] Field of Search ........................................... 277/212,
 205, 206; 92/240—246

[56] References Cited
UNITED STATES PATENTS
1,757,016  5/1930  Langdon ..................... 277/212
1,945,524  2/1934  Foehr ........................... 277/212

Primary Examiner—Laverne D. Geiger
Assistant Examiner—Robert I. Smith
Attorneys—J. L. Carpenter and E. J. Biskup ABSTRACT: A seal assembly for the space between a bore and a relatively reciprocating shaft includes a cup-shaped sealing member mounted at one end on the shaft and having an axially extending outer conical sleeve which radially outwardly terminates at the other end in a peripheral sealing edge defined by the intersection of the conical sleeve with a right cylindrical surface having an axis perpendicular to the axis of the sealing member. The sealing edge is in the form of a two-cycle sine wave and is biased against the bore by axial surface bending to establish sealing contact in an infinite number of radial planes.

PATENTED APR 13 1971

3,574,351

INVENTOR.
Donald D. Stoltman
BY
E. J. Biskup
ATTORNEY

RECIPROCATING SEAL ASSEMBLY

Seals of the type used to contain fluids in reciprocating environments normally have an inner or an outer diameter sealing surface which is biased into engagement with a mating surface by tensile or compressive deflection. The biasing force may be provided by the pressure of the contained fluid or by spring means such as a garter spring or a finger spring. Such seals are designed to contact the mating surface in a plane perpendicular to the axis of the assembly. However, when the axis of reciprocation is not coincident with the axis of assembly, the sealing surface is skewed or oblique with respect to the mating surface, a condition which results in an increased length of circumferential contact that must be accommodated by additional compressive or tensile deflection of the sealing member. The same conditions can also exist where the bore is geometrically tapered or noncircular. Therefore, the aforementioned seals require a material having sufficient tensile elasticity to establish an effective sealing contact under these circumstances, a requirement which essentially limits the material selection to elastomeric compounds having a relatively high tensile elasticity. While these materials achieve relatively satisfactory performance in most environments, due to their chemical and thermal instability, they tend to prematurely deteriorate when functioning in certain fluids such as gasoline or volatile oils.

The present invention contemplates a seal assembly for reciprocating applications which is relatively insensitive to tensile or compressive deflection such that a wide variety of nonelastomeric or metallic materials can be effectively utilized for the sealing member. In the preferred embodiment, the sealing member is formed in a one-piece, thin-walled sleeve having an axially extending outer conical surface. The sealing member outwardly terminates at a sealing edge which is established by a right cylindrical surface having an axis perpendicular to the axis of the sealing member and circumferentially intersecting the outer conical surface. As viewed circumferentially, the sealing edge is in the form of a two-cycle sine wave, and in this form, engages the bore in an infinite number of radial planes. The sealing edge, in the free form, has a minor diameter which is less than the diameter of the bore and a major diameter which is greater than the diameter of the bore.

Due to the aforementioned shape, the area adjacent the major diameter inwardly deflects by axial surface bending thereby forcing the minor diameter outwardly. Because of the sinusoidal sealing edge and the relative radial deflecting, the sealing circumference is essentially constant despite obliqueness in the assembly. Further, the diametral accommodation by surface bending provides an assembly which is relatively insensitive to tensile elasticity and one which provides an essentially constant sealing pressure independent of the roundness or concentricity of the mating parts.

Accordingly, an object of the present invention is to provide a seal wherein the biasing of a sealing member against a mating surface is achieved through surface bending thereby making the selection of a material for the sealing member independent of tensile elasticity considerations.

Another object of the present invention is to provide a seal which accommodates out-of-roundness and squareness as well as circumferential variations in the mating surface through a design utilizing surface bending rather than tensile or compressive deflection to achieve sealing engagement.

A further object of the present invention is to provide a seal assembly for sealing between relatively reciprocating parts wherein a thin-walled flexible seal has a conical surface that outwardly terminates at a constantly axially varying sealing surface, the arrangement providing for relative radial deflection of the seal without a change in the sealing circumference.

Still another object of the present invention is to provide a seal assembly for the space between the bore of a housing and a reciprocating shaft wherein a flexible, cup-shaped seal mounted at one end on the shaft includes a thin-walled conical sleeve having a low approach angle with respect to the housing and terminating at the other end at a sealing surface established by an axially facing right cylindrical surface having an axis perpendicular to the axis of the sleeve, the sealing surface circumferentially taking the form of a two-cycle sine wave such that sealing engagement with the bore is in an infinite number of radial planes and the sealing pressure against the bore is achieved by axial surface bending of the sealing member thereby permitting the use of a wide variety of materials for the latter.

These and other objects will be apparent to one skilled in the art upon reading the following detailed description, reference being made to the accompanying drawings in which.

Figures 1, 2, 3, 4, 5, 6:
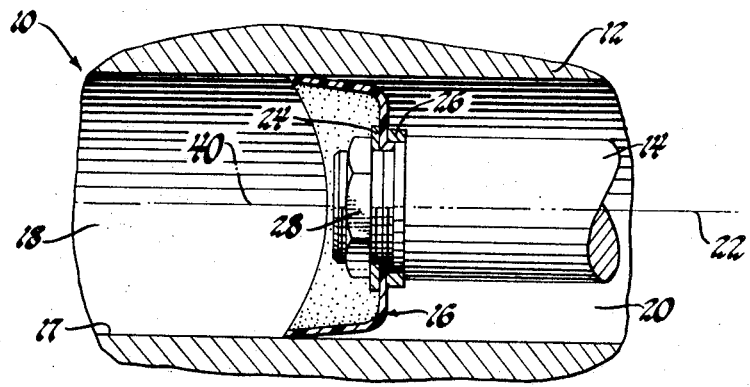
FIG. 1 is a side cross-sectional view of the seal assembly incorporating reciprocating seal and made in accordance with the present invention.
FIG. 2 is a side cross-sectional view of the reciprocating seal shown in FIG. 1.
FIG. 3 is a view taken along line 3–'of FIG. 2.
FIG. 4 is a view taken along line 4–4 of FIG. 2.
FIG. 5 is an enlarged fragmentary view of a portion of the seal assembly as shown in FIG. 1.
FIG. 6 is a diagrammatic view illustrating circumferential development of the sealing surface of the reciprocating seal as shown in FIGS. 1—5.

Referring to FIG. 1, there is shown a seal assembly 10 including a housing 12, a reciprocating shaft 14, and a reciprocating seal 16. The reciprocating seal 16 engages the surface of a cylindrical bore 17 formed in the housing 12 to establish a barrier against the migration of a fluid from a fluid chamber 18 to an atmospheric chamber 20 during axial reciprocation of the shaft 14 along an axis 22. The seal 16 is fixedly mounted on the shaft 14 between a pair of washers 24 and 26 and is secured thereto by a nut 28.

The seal 16 is generally cup shaped and has a thin-walled construction which may be formed of a wide variety of metallic, plastic, and elastomeric materials. Referring to FIG. 2, the seal 16 generally includes an axially extending conical sleeve 30 and an integral annular base 32 having a circular hub 34 defining an aperture 36 through which the end of the shaft 14 axially projects.

The conical sleeve 30 has an outer surface 38 which is a surface revolution about an axis 40. The outer surface 38 radially outwardly terminates at a circumferential sealing edge 42 established by an axially facing right cylindrical surface 44 having an axis 46 perpendicularly intersecting the axis 40 and having a radius $A$. As shown in FIGS. 2 and 4, the intersection of the surfaces 44 and 38 establishes a major diameter $B$ in a vertical plane B-B. The aforementioned intersection of surfaces as shown in FIGS. 3 and 4 establishes a minor diameter $C$ in a horizontal plane C-C. The outer surface 38 has a conical angle $D$ with respect to the axis 40. A mean diameter $E$ is established at a point substantially axially between the minor diameter $C$ and the major diameter $B$.

The reciprocating seal 16 is designed such that the major diameter $B$ is greater than the diameter of the bore 17 which, in turn, is greater than the minor diameter $C$. The sleeve 30 has a low approach angle with respect to the bore 17 which in combination with the mean diameter $E$ is selected to provide a predetermined unit loading or sealing pressure in assembly. Referring to FIG. 5, the outer surface 38 and sealing edge 42, in assembly, establish a sealing surface 50 with the bore 17 which has an axial width $F$.

The circumferential contact pattern is shown in FIG. 6 and represents a plot of the axial engagement of the sealing surface 50 with the bore 17 about the circumference of the sleeve 30. Because of the aforementioned intersection of the surface 44 and the outer surface 38, it will be appreciated that the illustrated contact pattern is in the form of a two-cycle sine wave having an axial width $F$. The constantly axially varying contact pattern thus established means that the seal 16 engages the bore 17 in an infinite number of radial planes independently of any relative inclination between the axes 22 and 40. In assembly, due to the aforementioned relative sizes between the diameters $B$, $C$, and $E$, the portion circumferentially adjacent plane $B-B$ will yield radially inwardly which, in turn, will force the portion circumferentially adjacent plane $C-C$ outwardly. Inasmuch as the aforementioned radial deflections are accomplished through surface bending of the sleeve 30, this diametral accommodation is effected without a change in sealing circumference in any plane thereby making the material selection for the latter relatively independent of tensile elasticity considerations. Therefore, a wider variety of materials can be used than in conventional seals which rely on compressive or tensile deflection for sealing engagement with the mating surface. Moreover, the roundness of the bore 17 does not effect the unit loading between the sleeve 30 and the housing 12 inasmuch as the configuration of the seal promotes circumferential equalization of the radial forces against the bore 17. A seal having the above-enumerated advantages was successfully tested using the following representative material and dimensions:

| | |
|---|---|
| Radius $A$ | 0.655 inch |
| Mean Diameter $E$ | 0.768 inch |
| Conical Angle $D$ | 10° |
| Material for Seal 16 | Acetal Copolymer |
| Thickness of the Seal | 0.070—0.014 inch |
| Diameter of the Bore | 0.730—0.745 inch |

Although only one form of this invention has been shown and described, other forms will be readily apparent to those skilled in the art. Therefore, it is not intended to limit the scope of this invention by the embodiment selected for the purpose of this disclosure but only by the claims which follow.

I claim:

1. A seal for the space between relatively reciprocating members comprising: a generally cup-shaped flexible member adapted to be carried at one end by one of the members and having a thin-walled conical sleeve portion extending axially beyond said one end, said sleeve portion terminating at the other end in a peripheral sealing edge defined by a compound surface generated by an axial cone intersected by a right cylinder having its axis perpendicular to the axis of said cone, said sealing edge having a major diameter in a plane perpendicular to said axis of said right cylinder and a minor diameter in a plane perpendicular to said first-mentioned plane whereby said sleeve portion is biased by axial surface bending into engagement with said other member in an infinite number of radial planes to establish sealing contact therewith and accommodate variations in the peripheral size of said flexible member and said other member by inward and outward deflecting action of said sleeve portion.

2. A seal assembly for sealing the space between a bore of a housing and a relatively reciprocating shaft comprising: a cup-shaped seal formed of a flexible material having an annular base carried on the shaft and a thin-walled conical sleeve extending axially outwardly from said base, said conical sleeve having a low approach angle with respect to said bore and radially outwardly terminating with a constantly axially varying sealing edge in the form of a two-cycle sine wave, said sealing edge being defined by a right cylinder having its axis perpendicular to the axis of the seal and intersecting said conical sleeve such that the diameter of said sealing edge in a plane perpendicular to said axis of said right cylinder is greater than the diameter of said bore and the diameter of said sealing edge in a plane perpendicular to said first-mentioned plane is less than the diameter of said bore whereby said conical sleeve is biased by axial surface bending into engagement with said bore to establish sealing contact therewith with variations in the diameter of said sealing member and said bore being accommodated by inward and outward deflecting of the sealing edge.